United States Patent
Tanaka

(12) United States Patent (10) Patent No.: US 7,502,056 B2
Tanaka (45) Date of Patent: Mar. 10, 2009

(54) MOVEMENT SIGNAL GENERATION APPARATUS, OPTICAL DEVICE, OPTICAL DEVICE CONTROL APPARATUS, AND VIDEO PRODUCTION SYSTEM

(75) Inventor: Isao Tanaka, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 665 days.

(21) Appl. No.: 11/050,582

(22) Filed: Feb. 3, 2005

(65) Prior Publication Data
US 2005/0179802 A1 Aug. 18, 2005

(30) Foreign Application Priority Data
Feb. 12, 2004 (JP) ............... 2004-034988

(51) Int. Cl.
H04N 5/262 (2006.01)
H04N 5/232 (2006.01)
H04N 5/225 (2006.01)
G03B 17/00 (2006.01)

(52) U.S. Cl. ............... 348/240.99; 348/240.3; 348/347; 348/207.1; 396/85; 396/87

(58) Field of Classification Search ............ 348/240.99, 348/240.3, 345, 347, 349, 361, 362, 363, 348/364, 207.1; 396/85, 86, 87, 93, 131, 396/135, 136, 240, 244, 246, 248, 250, 256; 359/676, 694, 695, 696, 697, 698, 822, 823, 359/824, 825
See application file for complete search history.

(56) References Cited

U.S. PATENT DOCUMENTS

| | | | |
|---|---|---|---|
| 4,864,344 A * | 9/1989 | Arakawa et al. | ............ 396/135 |
| 4,984,001 A | 1/1991 | Himuro | |
| 5,023,645 A * | 6/1991 | Yoshida et al. | ................ 396/87 |
| 5,758,208 A * | 5/1998 | Fujii et al. | ..................... 396/87 |
| 5,930,054 A * | 7/1999 | Kasuya | ....................... 359/698 |
| 6,292,313 B1 | 9/2001 | Kanayama et al. | |

(Continued)

FOREIGN PATENT DOCUMENTS

EP 0 947 870 A1 10/1999

(Continued)

OTHER PUBLICATIONS

Thoma G. et al., "Kamera-Support-Systeme IM Virtuellen Studio", FKT Fernseh Und Kinotechnik, Fachverlag Schiele & Schon GmBH, Berlin, DE, vol. 50, No. 1, Jan. 1996, pp. 36-37, XP000555568, ISSN: 1430-9947.

(Continued)

*Primary Examiner*—David L Ometz
*Assistant Examiner*—Peter Chon
(74) *Attorney, Agent, or Firm*—Morgan&Finnegan, LLP

(57) ABSTRACT

A movement signal generation apparatus is disclosed which can convert an analog position signal of an optical adjustment unit into digital signals representing a movement amount and a movement direction of the optical adjustment unit and output the digital signals. The movement signal generation apparatus includes an analog signal output section which outputs an analog signal in accordance with the position of the optical adjustment unit, and a digital signal generation section which generates two digital signals in accordance with a movement amount and a movement direction of the optical adjustment unit based on the analog signal.

8 Claims, 14 Drawing Sheets

U.S. PATENT DOCUMENTS 6,856,477 B2 * 2/2005 Morimoto .................. 359/824
2005/0179802 A1 * 8/2005 Tanaka ....................... 348/335

FOREIGN PATENT DOCUMENTS

| EP | 0 989 747 A2 | 3/2000 |
|---|---|---|
| EP | 0 989 747 A3 | 11/2000 |
| EP | 1 139 192 A1 | 10/2001 |
| JP | 6-121280 A | 4/1994 |

OTHER PUBLICATIONS

Sommerhauser F: "Das Virtuelle Studio Grundlagen Einer Neuen Studioproduktionstechnik" FKT Fernseh Und Kinotechnik, Fachverlag Schiele & Schon GmBH., Berlin, DE, vol. 50, No. 1, Jan. 1996, pp. 11-16, 18, XP000555564, ISSN: 1430-9947.

European Search Report mailed Jun. 29, 2006 (Appln. No. 05250765.4-2202).

* cited by examiner

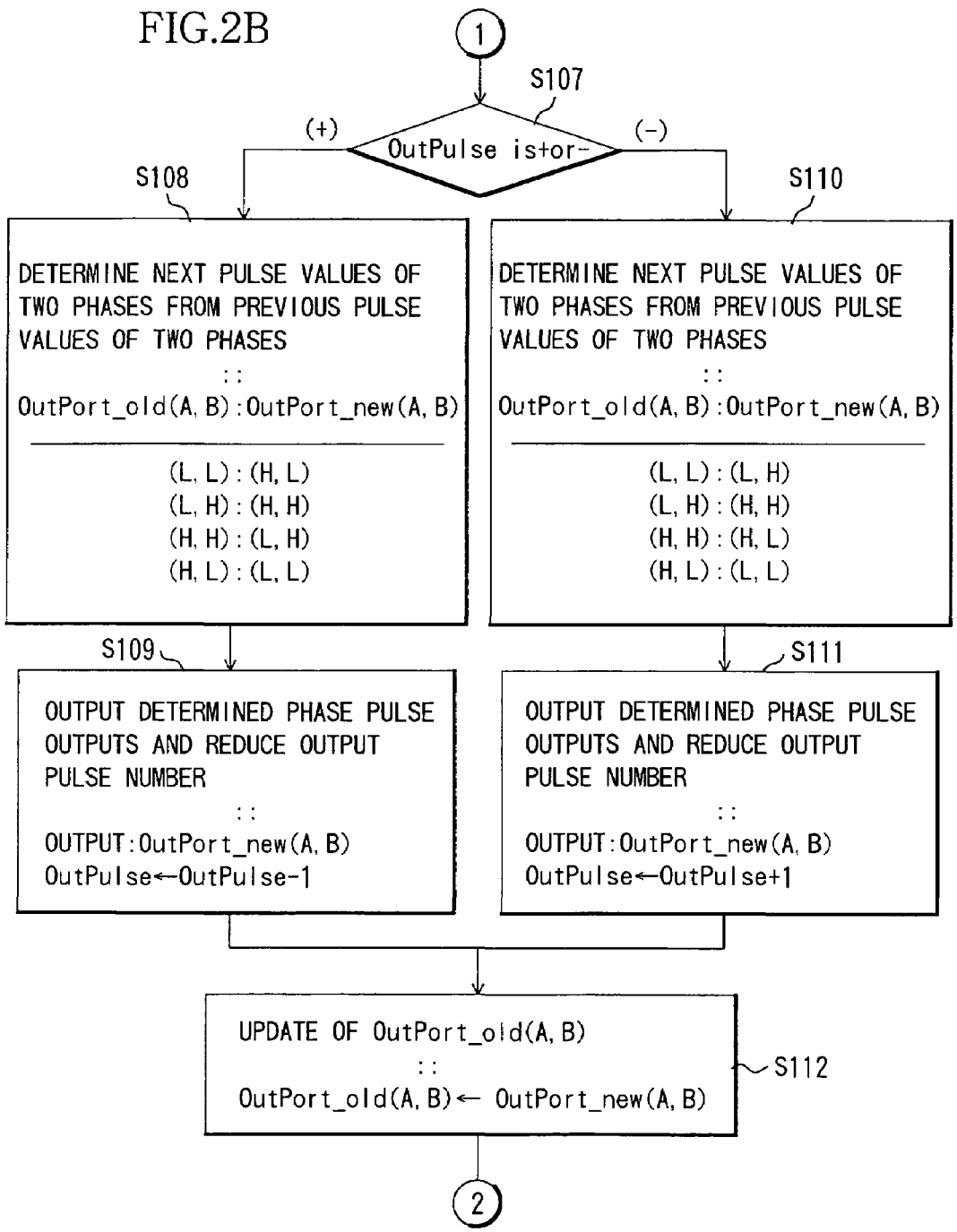

MOVEMENT SIGNAL GENERATION APPARATUS, OPTICAL DEVICE, OPTICAL DEVICE CONTROL APPARATUS, AND VIDEO PRODUCTION SYSTEM

BACKGROUND OF THE INVENTION

1. Field of the Invention

The present invention relates to an apparatus which outputs a signal in connection with the movement of an optical adjustment unit provided for an optical device such as a television camera system, and more particularly, to a movement signal generation apparatus which can be applied to a video production system such as a virtual system which combines live-action video with computer graphics.

2. Description of Related Art

Conventionally, in a television lens, optical adjustment units such as a zoom lens, a focus lens, an iris, and an extender are electrically or manually operated to cause an optical change in an object image. This can create a desired video scene. Such an optical adjustment unit is coupled to a potentiometer or a rotary encoder. The detection result of the position of the optical adjustment unit is used for servo drive or display of the position of the optical adjustment unit.

The television lenses include large lenses with high accuracy for use in studios and the like and handy-sized lenses with favorable portability for use outdoors or on a user's shoulder. For the large lenses, an encoder which outputs digital signals with two phases is used as a position detector of an optical adjustment unit. For the handy-sized lenses, a potentiometer which outputs an analog signal is typically used.

In recent years, Japanese Patent Laid-Open No. H06 (1994)-121280 has disclosed a system which is called a virtual system and combines live-action video with computer graphic video related to the live-action video. The system employs a television lens such as the large lens and the handy-sized lens as described above.

Such a virtual system receives a signal (representing a zoom position, a focus position and the like) from a position detector linked with an optical adjustment unit of a television lens. This allows a computer in the system to produce computer graphic images corresponding to the size and the focal point of the live-action images to provide combined video without a feeling of strangeness even when zooming or focusing is performed in real time.

FIG. 9 primarily shows the structure of a zoom system of a large lens which is used for a virtual system. In FIG. 9, reference numeral 100 shows a television lens, reference numeral 101 shows a CPU which is responsible for control of the television lens, reference numeral 102 shows a DA converter to which the CPU 101 writes a command value in driving zoom, and reference numeral 103 shows an power amplifier which amplifies the power of the command from the DA converter 102.

Reference numeral 104 shows a motor which is driven with the power amplifier 103, reference numeral 105 shows a zoom lens which is coupled to the motor 104 and is moved in an optical axis direction to provide variable magnification, and reference numeral 106 shows a zoom digital encoder which serves as a zoom position detector linked with the zoom lens 105. Reference numeral 120 shows a counter which counts pulse signals with two phases from the zoom digital encoder 106 and uses the resultant data as a zoom position.

While FIG. 9 shows the structure of the zoom system in the television lens, the structures for a focus lens, an iris, and an extender are the same as the zoom system.

With the structure, when a zoom drive command signal is input from a command apparatus (demand), not shown, connected to the television lens 100, the CPU 101 uses the zoom drive command signal and a current zoom position taken from an AD converter 108 to calculate a new zoom command position and writes the result to the DA converter 102, thereby enabling zoom position control.

Pulse signals with two phases from the zoom digital encoder 106 are input as a zoom position signal 301 to a virtual system 200, described next.

The virtual system 200 receives the pulse signals with two phases 301 which correspond to the zoom position signal from the television lens 100. Reference numeral 202 shows a counter which calculates the position of the zoom lens 105 from the zoom position signal 301, and 201 shows a system CPU which takes the zoom position from the counter 202, and a focus position from a focus counter, not shown, an iris position, and an extender position. The system CPU 201 combines a video signal from a television camera, not shown, connected to the television lens 100 with a computer graphic image produced in the virtual system 200. At this point, processing is performed such that the computer graphic image matches the video signal from the television camera based on the zoom, focus, iris, and extender position signals input from the television lens 100 as pulse signals with two phases. Both of the images are then combined to complete virtual video without a feeling of strangeness.

FIG. 10 shows the zoom position signal (interface signal) 301 in detail as the pulse signals with two phases which connect the television lens 100 with the virtual system 200.

The digital signals C and D with two phases can be used to calculate relative position data and absolute position data of the zoom lens 105 as shown.

The virtual system 200 in FIGS. 9 and 10 is used in the large television lens. Since the interface signal 301 as the digitized pulse signals with two phases is provided to allow the reliable transmission of the zoom position information without being affected by noise even when the television lens 100 is located far away from the virtual system 200. In addition, the digital encoder 106 of the television lens 100 can have higher resolution to enhance the accuracy in combining the video signal from the television camera with the graphic image.

In the structure shown in FIG. 9, however, the pulse signals with two phases are output from the digital encoder 106 linked with the zoom lens 105, so that the output period of the digital signals with two phases is changed as T1 and T2 shown in FIG. 10 depending on the drive speed of the zoom lens 105. This means that the period of the pulse signals with two phases is so short that the virtual system 200 cannot respond thereto when the digital encoder 106 with high resolution is used to perform high-speed drive.

FIG. 11 shows the structure of a zoom system of a handy-sized lens which is used for a virtual system. In FIG. 11, reference numeral 110 shows a television lens, and 150 shows a drive unit which is mounted on the television lens 110. In FIG. 11, components identical to those in FIG. 9 are designated with the same reference numerals as those in FIG. 9.

While the digital encoder 106 and the counter 120 constitute the digital position detection system in FIG. 9, a potentiometer 109 which outputs an analog signal serves as a position detector of a zoom lens 105 in the structure of FIG. 11. In connection therewith, an operational amplifier 107 and an AD converter 108 are provided. Although not shown, the structures for a focus lens, an iris, and an extender are similar to that of the zoom system.

In the virtual system 200, an operational amplifier 203 for interface matching and an AD converter 204 are provided instead of the counter 202. In the structure described above, a zoom position signal 302 as an interface signal input to the virtual system 200 from the television lens 110 is an analog position signal shown in FIG. 12.

In the structure in which the handy-sized lens is used described above, the zoom position signal 302 as the interface signal is the analog position signal which is sensitive to external noise and may not accurately transmit the position information about the zoom lens, a focus lens and the like in the television lens 110. Another problem is the difficulty in increasing the accuracy of video combination due to permanent noise components.

In addition, the interface signal 302 is a signal regulated on the lens side, and the dedicated operational amplifier and AD converter are necessary for the reception circuit in the virtual system 200 as compared with the pulse signals with two phases. This increases the cost and limits its uses.

SUMMARY OF THE INVENTION

It is an object of the present invention to provide a movement signal generation apparatus which can convert an analog position signal of an optical adjustment unit into digital signals representing a movement amount and a movement direction of the optical adjustment unit and output the digital signals.

According to one aspect, the present invention provides a movement signal generation apparatus which generates a signal representing a movement of an optical adjustment unit and includes an analog signal output section which outputs an analog signal in accordance with the position of the optical adjustment unit and a digital signal generation section which generates two digital signals in accordance with a movement amount and a movement direction of the optical adjustment unit based on the analog signal.

According to one aspect, the present invention provides an optical device which includes the aforementioned movement signal generation apparatus and an optical adjustment unit.

According to one aspect, the present invention provides an optical device control apparatus which includes the aforementioned movement signal generation apparatus and a drive mechanism which drives an optical adjustment unit.

According to one aspect, the present invention provides a video production system which includes the aforementioned movement signal generation apparatus, and a video combination apparatus which combines a first video signal taken with the optical adjustment unit with image information taken separately from the first video signal based on the two digital signals generated in the digital signal generation section of the movement signal generation apparatus.

These and other characteristics of the movement signal generation apparatus, the optical device, the optical device control apparatus, and the video production system of the present invention will be apparent from the following description of specific embodiments with reference to the drawings.

BRIEF DESCRIPTION OF THE DRAWINGS

FIGS. 2A and 2B are flow chart of an output processing program of pulse trains with two phases in Embodiment 1;

DETAILED DESCRIPTION OF THE PREFERRED EMBODIMENTS

Preferred embodiments of the present invention are hereinafter described with reference to the drawings.

Embodiment 1

Figure 1:
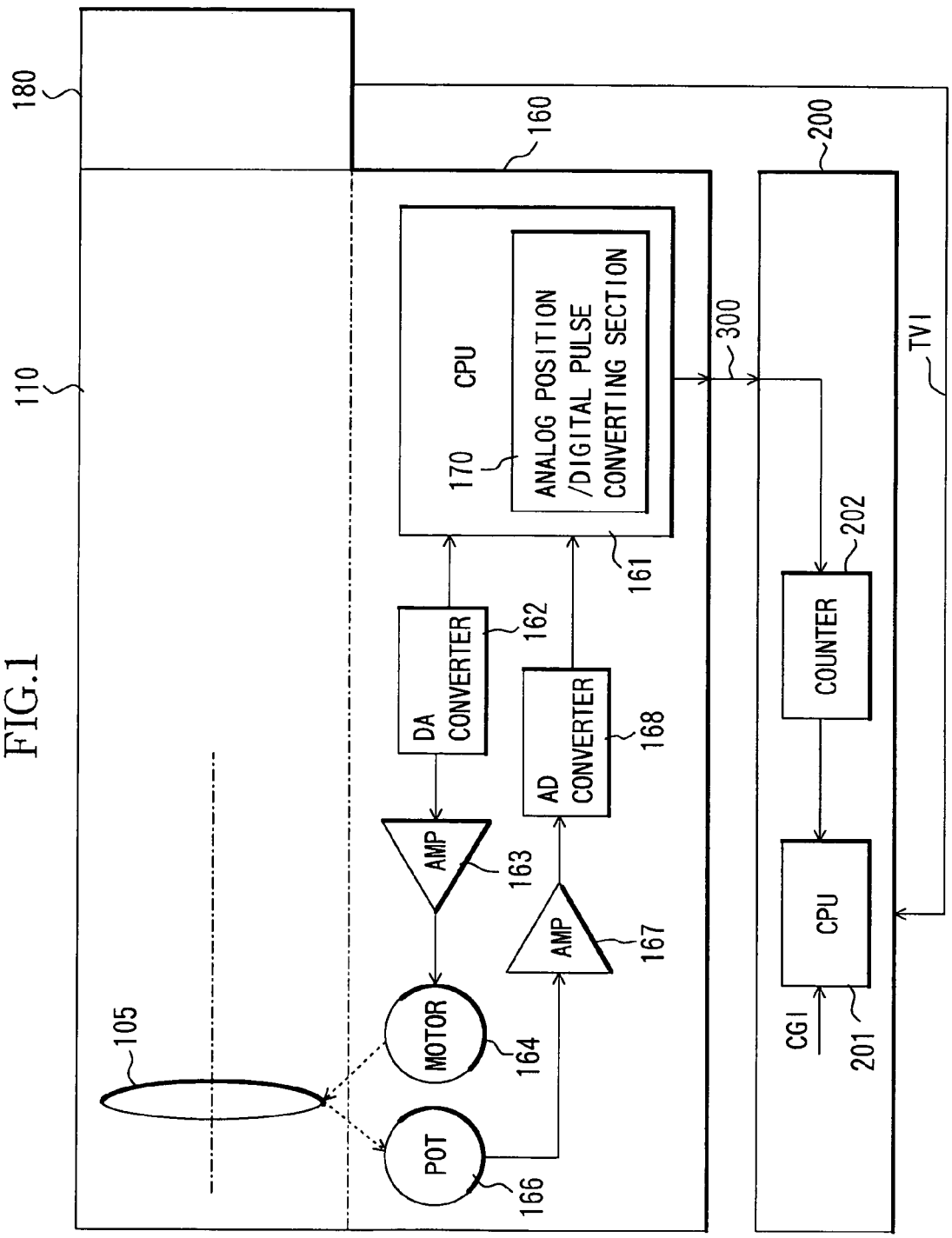
FIG. 1 is a block diagram showing a virtual video combination system which is Embodiment 1 of the present invention.

FIG. 1 shows the structure of a virtual video combination system which is Embodiment 1 of the present invention. In FIG. 1, reference numeral 110 shows a television lens which has optical adjustment units such as a zoom lens 105 movable in an optical axis direction, a focus lens, an iris, an extender and the like, which are not shown.

Reference numeral 160 shows a drive unit mounted on the television lens 110. Reference numeral 161 shows a drive unit CPU serving as a controller which is responsible for control of the drive unit 160, and 162 shows a DA converter to which the drive unit CPU 161 writes a command value in driving zoom.

Reference numeral 163 shows a power amplifier which amplifies the power of the command from the DA converter 162, and 164 shows a motor which is driven with the operational amplifier 163. The drive force of the motor 164 is transmitted to the zoom lens 105 through a drive transmission mechanism, not shown. This drives the zoom lens 105 in the optical axis direction to provide variable magnification.

Reference numeral 166 shows a zoom potentiometer serving as a zoom position detector which is linked with the zoom lens 105 and outputs an analog signal (analog position signal) in accordance with the position of the zoom lens 105. Reference numeral 167 shows an operational amplifier which provides circuit matching to allow the analog signal from the zoom potentiometer 166 to be taken into the drive unit CPU 161. Reference numeral 168 shows an AD converter which digitizes the zoom position signal which is the analog signal after the circuit matching.

Reference numeral 170 shows an analog position/digital pulse converting section (movement signal generation apparatus) which is provided within the drive unit CPU 161. The analog position/digital pulse converting section 170 performs an analog position/digital pulse conversion program which is stored as a computer program in a memory, not shown, in the drive unit CPU 161 to convert the digital signal representing the zoom position read from the AD converter 168 into digital pulse train signals with two phases (hereinafter simply referred to as pulse train signals with two phases), later described.

The analog position/digital pulse converting section 170 may be constituted as a separate apparatus attached to the drive unit CPU 161 or to the drive unit 160.

While FIG. 1 shows the structure of the zoom system of the television lens 110, various optical adjustment units such as the focus lens, iris, extender and the like have structures similar to that of the zoom system.

In the structure, when a zoom drive command signal is input from a command apparatus (demand), not shown, connected to the television lens 110, the drive unit CPU 161 uses the zoom drive command signal and a current zoom position taken from the AD converter 168 to calculate a new zoom command position and writes the result to the DA converter 162. This enables zoom position control to the new zoom command position.

Pulse train signals with two phases generated by the analog position/digital pulse converting section 170 are input as a zoom position signal 300 to a virtual system 200, described next.

The virtual system 200 receives the pulse train signals with two phases 300 which correspond to the zoom position signal from the drive unit 160. The pulse train signals with two phases 300 serve as an interface signal which connects the drive unit 160 with the virtual system 200.

Reference numeral 201 shows a system CPU which is responsible for control of signal taking in the virtual system 200, video combination processing, later described, and the like.

Reference numeral 202 shows a counter which calculates the zoom position from the pulse train signals with two phases 300. The system CPU 201 takes the zoom position from the counter 202, and a focus position from a focus counter (not shown), an iris position from an iris counter (not shown), and an extender position from an extender counter (not shown), by way of example. The system CPU 201 then combines a video signal TVI taken by a television camera 180 connected to the television lens 110, that is, by the television camera 180 through optical devices such as the zoom lens 110, the focus lens, iris, and extender, not shown, with a computer graphic image CGI created in the virtual system 200 or taken into the virtual system 200.

In this processing, the system CPU 201 processes the computer graphic image CGI to match the video signal TVI from the television camera 180 based on the zoom, focus, iris, and extender positions calculated with the pulse train signals with two phases 300 from the drive unit 160. And the system CPU 201 combines the processed computer graphic image CGI with the video signal TVI from the television camera 180. In this manner, the virtual video is completed.

Figure 2A:
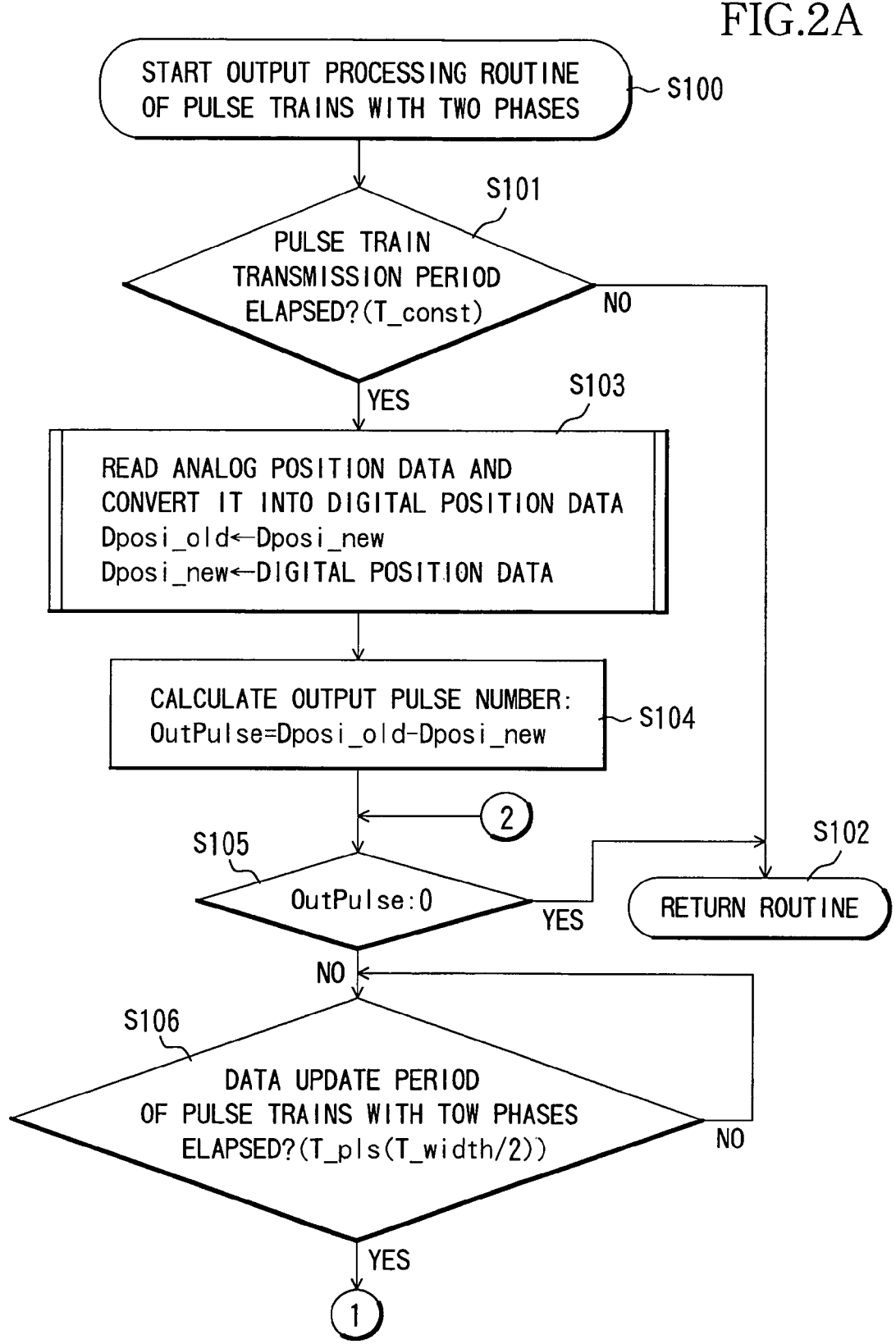

FIGS. 2A and 2B show flow charts of an output processing program of pulse trains with two phases as the analog position/digital pulse converting program in the drive unit CPU 161.

First, at step (abbreviated as "S" in the figures) 100, the processing routine is started. At step 101, it is determined whether or not a preset certain pulse train transmission period (T_const) has elapsed. The pulse train transmission period (T_const) is regulated by a processing program (subroutine), not shown. If the pulse train transmission period (T_const) has elapsed, the process proceeds to step 103, or to step 102 if it has not elapsed. In a return routine at step 102, other processing is performed and the process returns to step 100.

At step 103, the analog position/digital pulse converting section 170 reads digital position data provided by converting an analog position signal from the potentiometer 166 in the AD converter 168 to generate pulse train signals with two phases. Specifically, the analog position/digital pulse converting section 17b stores digital position data (Dposi_new), which was taken and stored in a memory, not shown, in the routine immediately before the current routine, again in the memory as the previous digital position data (as a Dposi_old), and stores digital position data (as the Dposi_new) taken in the current routine in the memory. The process proceeds to step 104.

At step 104, the difference between the previous digital position data (Dposi_old) and the current digital position data (Dposi_new) is calculated, and the difference value is defined as an output pulse number (OutPulse). The process then proceeds to step 105. The output pulse number (OutPulse) is the number of pulse components with a sign to be included in a first phase pulse train signal A and a second phase pulse train signal B which constitute pulse train signals with two phases. The output pulse number (OutPulse) takes the value of zero, or a positive number (for example, on the telephoto side) or a negative number (for example, on the wide-angle side).

At step 105, the output pulse number (OutPulse) is compared with zero, and if the comparison shows that it is equal to zero, the process proceeds to the return routine at step 102.

If the output pulse number (OutPulse) is not equal to zero at step 105, the process proceeds to step 106.

At step 106, it is determined whether or not a preset data update period (T_pls) of the pulse train signals with two phases has elapsed. The data update period (T_pls) is set to T_width/2 when the pulse width of each pulse component is defined as T_width. The pulse width T_width of each pulse component is set to be uniform and the same in the first phase and the second phase. If the data update period (T_pls) has elapsed, the process proceeds to step 107. If it has not elapsed, the process returns to step 106. The data update period (T_pls) of the pulse train signals with two phases is regulated by a processing program (subroutine), not shown.

At step 107, it is determined whether the sign of the output pulse number (OutPulse) is positive or negative. If it is positive, the process proceeds to step 108. If it is negative, the process proceeds to step 110.

At step 108, when the sign of the output pulse number (OutPulse) is positive, output values of the two phases are determined as the respective output values of the first and second phase pulse train signals. Specifically, new output values of the two phases (OutPort_new(A, B)) are determined for the current output values of the two phases (OutPort_old (A, B)) by making a selection from a table in S108 of FIG. 2B. The process then proceeds to step 109. For example, when the current output values of the two phases (OutPort_old(A, B)) are (L, L), the new output values of the two phases (OutPort_new(A, B)) are (H, L). When the current output values of the two phases (OutPort_old(A, B)) are (H, H), the new output values of the two phases (OutPort_new(A, B)) are (L, H).

At step 109, the output values of the two phases (OutPort_new(A, B)) determined at step 108 are actually output and the output pulse number (OutPulse) is reduced by one (OutPulse−1). Then, the process proceeds to step 112.

On the other hand, if the output pulse number (OutPulse) has the negative sign in the step 107, new output values of the two phases (OutPort_new(A, B)) are determined for the current output values of the two phases (OutPort_old(A, B)) by making a selection from a table shown in S110 of FIG. 2B. The process then proceeds to step 111. For example, when the current output values of the two phases (OutPort_old(A, B)) are (L, L), the new output values of the two phases (OutPort_new(A, B)) are (L, H). When the current output values of the two phases (OutPort_old(A, B)) are (H, H), the new output values of the two phases (OutPort_new(A, B)) are (H, L).

At step 111, the output values of the two phases (OutPort_new(A, B)) determined at step 110 are actually output and the output pulse number (OutPulse) is reduced by one (OutPulse+1). Then, the process proceeds to step 112.

At step 112, the output values are updated (OutPort_old(A, B)←OutPort_new(A, B)) in order to determine the next output values of the two phases, and then the process proceeds to step 105.

Figure 3:
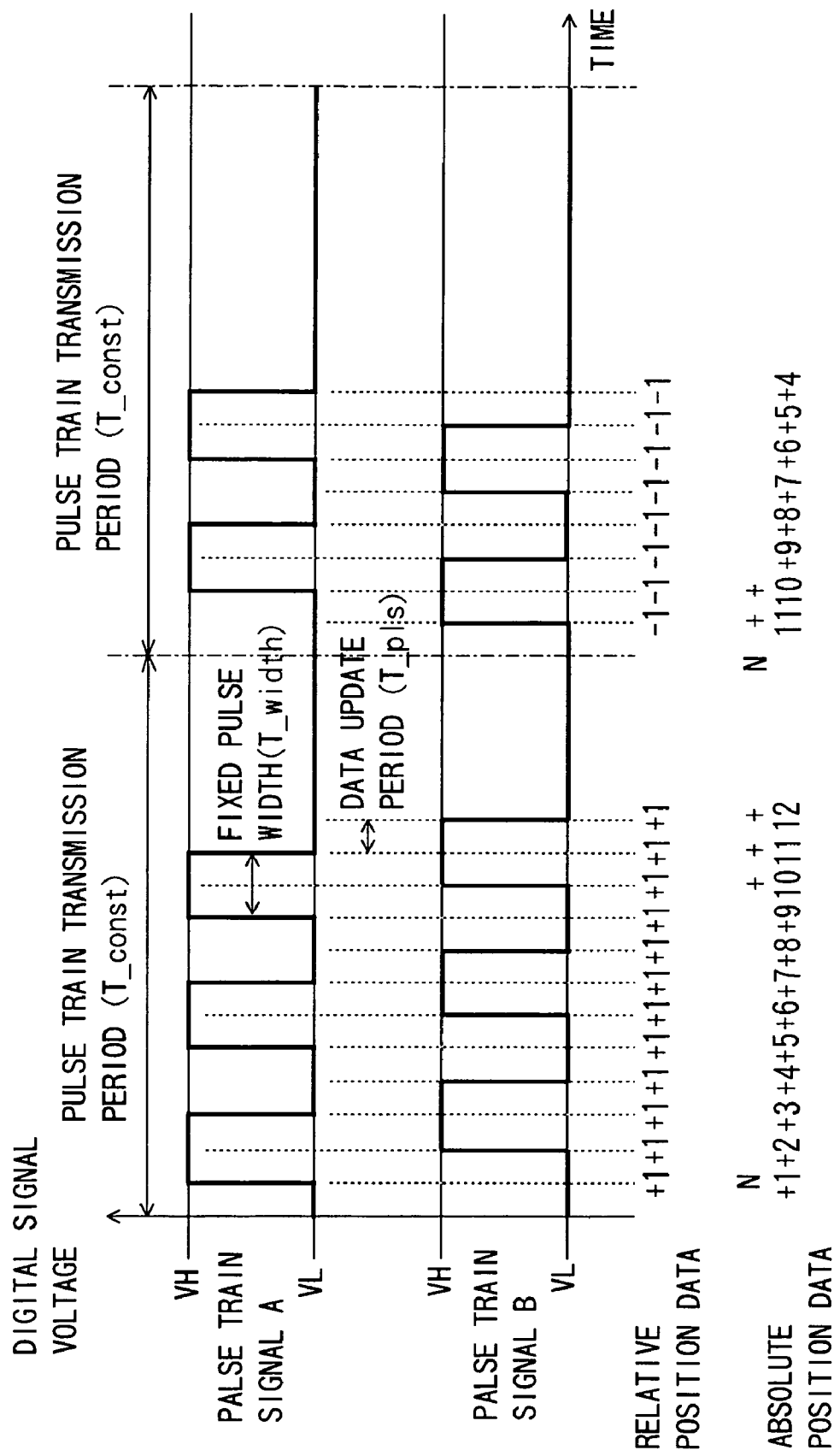
FIG. 3 shows, in detail, an interface signal between a television lens (drive unit) and a virtual system in Embodiment 1.

Next, FIG. 3 shows the pulse train signals with two phases 300 as the interface signal which is generated with the processing program in FIGS. 2A and 2B and is output from the drive unit 160 to the virtual system 200.

When the position of the zoom lens 105 is updated (moved), the analog position/digital pulse converting section 170 outputs the pulse train signals with two phases (the first and second phase pulse train signals A, B) which have a certain number of pulse components (output pulse number OutPulse) in accordance with the difference between the current and previous zoom positions for each pulse train transmission period (T_const) and have the output values of the two phases determined for each data update period (T_pls).

In FIG. 3, each of the first and second phase pulse train signals A, B output in the pulse train transmission period (T_const) on the left has three pulse components. The second phase pulse train signal B lags (with a phase difference in a lagging direction) the first phase pulse train signal A by one data update period (T_pls). In this case, when the counter 202 of the virtual system 202 receives the pulse train signals with two phases, it produces relative position data +1 of the zoom position for each data update period (T_pls) and increments the absolute position data of the zoom position by one. Then, the system CPU 201 takes the absolute position data to detect the zoom position (the absolute position +12 which is shifted 11 pulse components to the positive side from the position +1).

On the other hand, in FIG. 3, each of the first and second phase pulse train signals A, B output in the pulse train transmission period (T_const) on the right has two pulse components. The second phase pulse train signal B leads (with a phase difference in a leading direction) the first phase pulse train signal A by one data update period (T_pls). In this case, when the counter 202 of the virtual system 200 receives the pulse train signals with two phases, it produces relative position data −1 of the zoom position for each data update period (T_pls) and decrements the absolute position data of the zoom position by one. Then, the system CPU 201 takes the absolute position data to detect the zoom position (the absolute position +4 which is shifted 7 pulse components to the negative side from the position +11).

While the pulse train signals with two phases are shown in conjunction with the zoom position, similar pulse train signals with two phases are generated for various optical adjustment units such as a focus lens, an iris, an extender and the like.

Since the drive unit 160 including the analog position/digital pulse converting section 170 described in Embodiment 1 is used, the interface signal output to the virtual system 200 from the camera system (110, 180) including the drive unit 160 can be realized by the pulse train signals with two phases as the digital signals even when the potentiometer 166 outputs the analog position signal. It is thus possible to perform virtual video combination with high accuracy and less susceptibility to the influence of ambient noise.

In addition, the pulse train signals with two phases having the uniform pulse width (T_width) can be output to prevent the situation in which the zoom lens 105 and other optical adjustment units are moved so fast that the virtual system 200 cannot respond thereto.

When the analog position signal is used as the interface signal, the operational amplifier and the AD converter are necessary in the reception circuit in the conventional virtual system. In contrast, Embodiment 1 can employ the digital reception circuit which requires none of them. This allows a wide variety of uses of the virtual system 200 and a reduction in cost of the virtual system 200.

Embodiment 2

Figure 4:
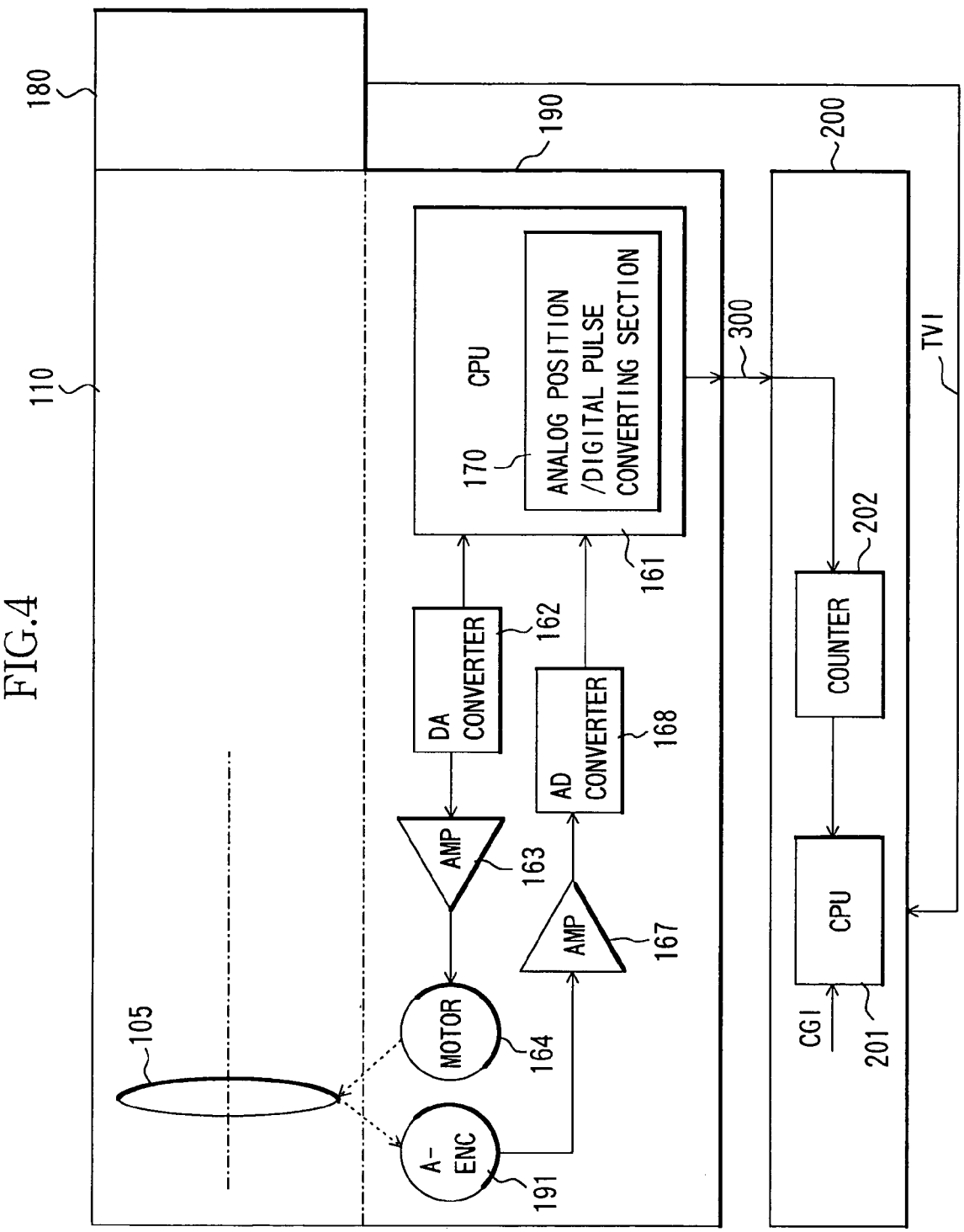
FIG. 4 is a block diagram showing a virtual video combination system which is Embodiment 2 of the present invention.

FIG. 4 shows the structure of a virtual video combination system which is Embodiment 2 of the present invention. In FIG. 4, components identical to those in Embodiment 1 are designated with the same reference numerals as those in FIG. 1 and description thereof is omitted.

In Embodiment 1, the potentiometer 166 is used as the zoom position detector mounted on the drive unit 160. However, in Embodiment 2, an analog encoder (A-ENC) 191 which outputs a two-phase sine wave (an analog position signal) is used as the zoom position detector.

Figure 5:
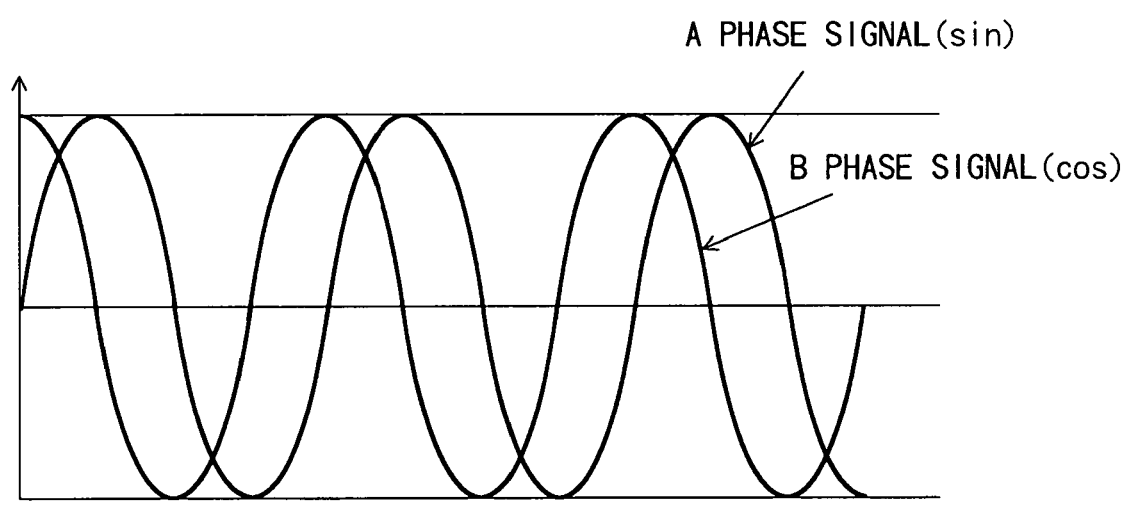
FIG. 5 shows, in detail, output signals from an analog encoder in Embodiment 2.

In FIG. 4, the analog encoder 191 outputs analog signals with two phases which consist of a sine signal as an A-phase signal and a cosine signal as a B-phase signal as shown in FIG. 5. As compared with the digital encoder which has the minimum resolution equal to a quarter of a period, the analog encoder is a position sensor with higher resolution which allows an AD converter to read a sine signal and a cosine signal for a period corresponding to a quarter of the period of the digital encoder.

In FIG. 4, the analog signals with two phases output from the analog encoder 191 pass through an operational amplifier 167 which provides matching of the analog signal values, is converted into digital signals with two phases by an AD converter 168, and is taken into a drive unit CPU 161.

An analog position/digital pulse converting section 170 of the drive unit CPU 161 uses the analog position/digital pulse conversion program shown in FIGS. 2A and 2B to generate pulse train signals 300 with two phases as an interface signal from a drive unit 190 to a virtual system 200 shown in FIG. 4.

The analog position/digital pulse converting section 170 may be constituted as a separate apparatus attached to the drive unit CPU 161 or to the drive unit 190.

While FIG. 4 shows the structure of the zoom system of a television lens 110, various optical adjustment units such as a focus lens, an iris, an extender and the like have the structures similar to that of the zoom system.

According to Embodiment 2, when the analog encoder (A-ENC) 191 is used as the analog position detector, the analog position/digital pulse converting section 170 can generate the interface signal between the drive unit 160 and the virtual system 200 as the digitized pulse train signals with two phases similarly to Embodiment 1. It is thus possible to perform virtual video combination with high accuracy and less susceptible to the influence of ambient noise.

Embodiment 3

Figure 6A:
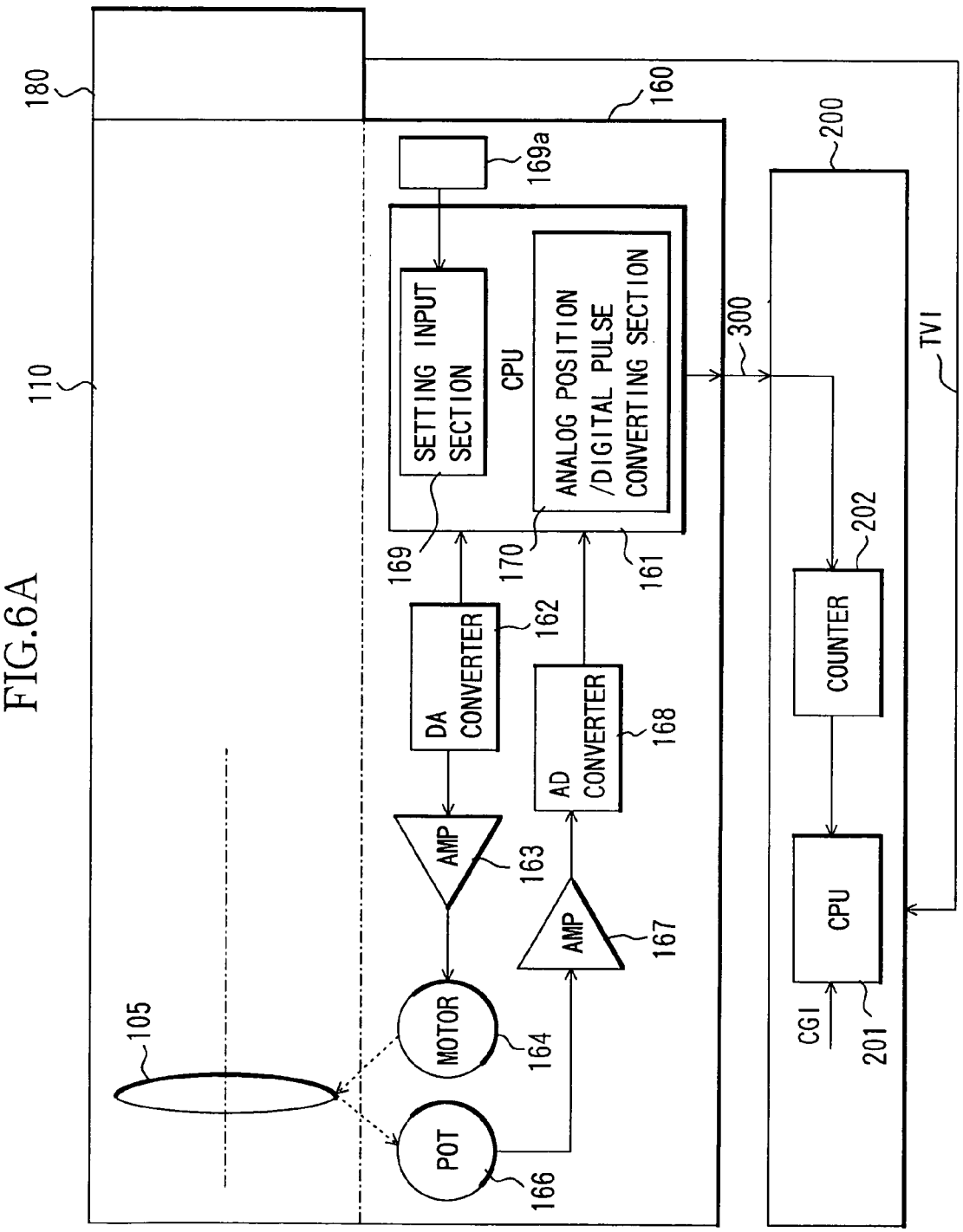
FIG. 6A is a block diagram showing a virtual video combination system which is Embodiment 3 of the present invention.

FIG. 6A shows Embodiment 3 in which a setting input section 169 is added to the drive unit CPU 161 and a setting operation unit 169a for a user to perform operation is added to the drive unit 160 in the virtual video combination system shown in Embodiment 1 described above.

The setting input section 169 is used to variably set the number of pulses over the entire zoom range in a drive unit 160 in accordance with a position resolution and a response frequency required from a virtual system 200, that is, the number of pulse overall total of pulse train signals with two phases output when a zoom lens 105 is moved from the telephoto end to the wide-angle end, and the pulse width (T_width, hereinafter referred to as a pulse width of signals with two phases) of the pulse train signals with two phases, in accordance with an operation signal provided in response to switch operation on the setting operation unit 169a. It is possible that a personal computer is connected to the drive unit 160 instead of the setting operation unit 169a such that an input signal from the computer is relied on to variably set the entire range drive pulse number of the zoom lens 105 and the pulse width of signals with two phases. Alternatively, variable setting can be performed through a communication unit such as an existing serial interface from a television camera, not shown, or the virtual system 200.

Figure 6B:
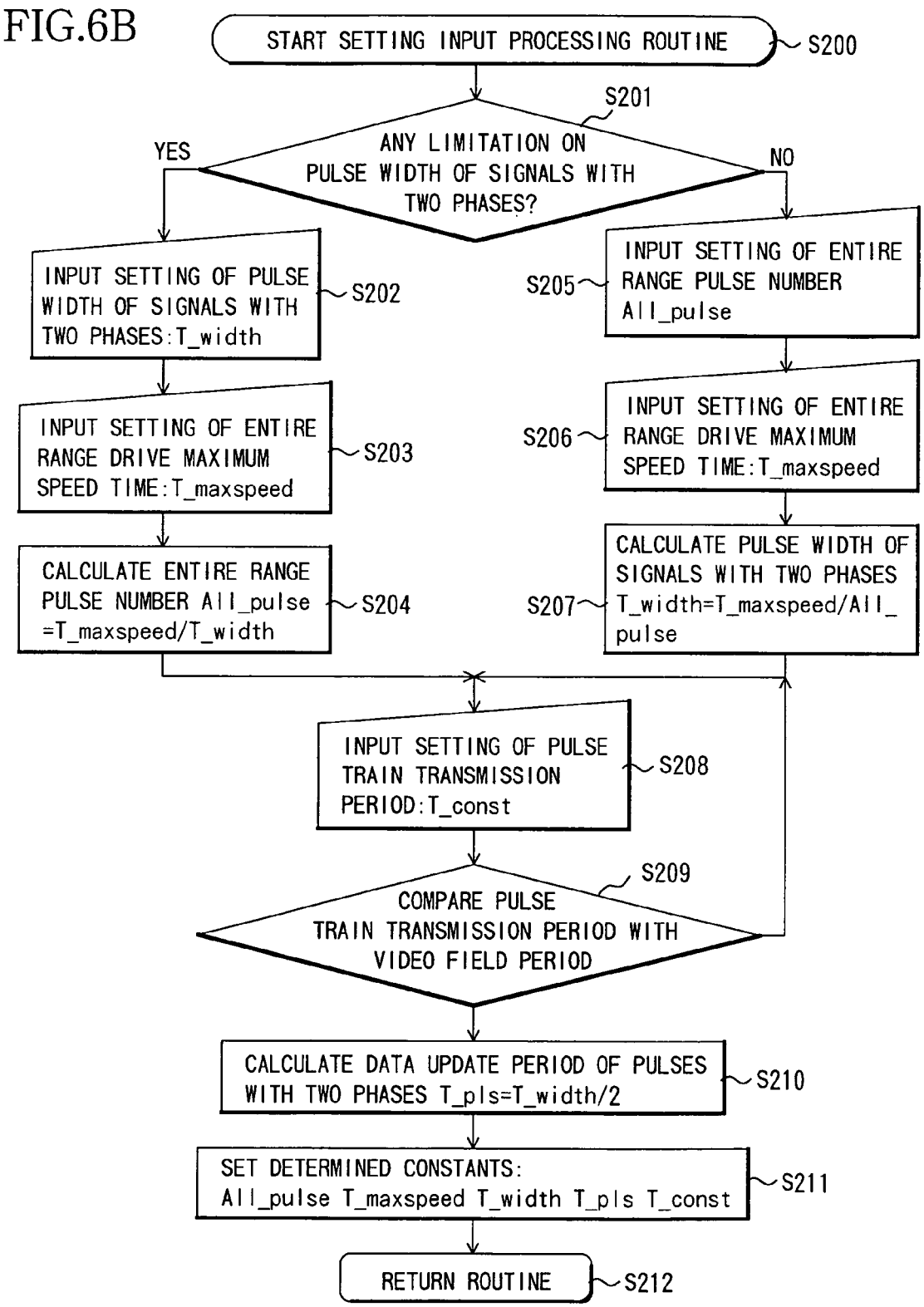
FIG. 6B is a flow chart of a setting input processing program in Embodiment 3.

FIG. 6B shows a flow chart of a setting processing program performed in the setting unit section 169 provided in a drive unit CPU 161.

After the setting processing is started at step 200, it is determined at step 201 whether or not any limitation is imposed on the pulse width (T_width) to which the virtual system 200 can respond. If there is any limitation, the process proceeds to step 202, or to step 205 if not.

At step 202, the pulse width (T_width) of signals with two phases is set in response to switch operation or the like on the aforementioned setting operation unit 169a. Then, the process proceeds to step 203.

At step 203, the entire range drive maximum speed time (T_maxspeed) of the zoom lens 105 is set in response to switch operation or the like on the setting operation unit 169a, and then the process proceeds to step 204.

At step 204, the entire range pulse number is calculated (All_pulse=T_maxspeed/T_width) from the set entire range drive max speed time (T_maxspeed) and pulse width (T_width) of signals with two phases. The process then proceeds to step 208.

On the other hand, if it is determined at step 201 that no limitation is imposed on the pulse width (T_width) of signals with two phases, the process proceeds to step 205 to set the entire range pulse number (All_pulse) necessary for the virtual system 200. Thereafter, the process proceeds to step 206.

At step 206, the entire range drive maximum speed time (T_maxspeed) of the drive unit 160 is set, and then the process proceeds to step 207.

At step 207, the pulse width of signals with two phases is calculated (T_width=T_maxspeed/All_pulse) from the set entire range pulse number (All_pulse) and entire range drive maximum speed time (T_maxspeed). The process then proceeds to step 208. At step 208, a pulse train transmission period (T_const) is input, and then the process proceeds to step 209.

At step 209, the input pulse train transmission period (T_const) is compared with a video field period (for example, 1/60 second in the NTSC method or 1/50 second in the PAL method for a vertical synchronization period). If the pulse train transmission period (T_const) is longer, the process returns to step 208 where the pulse train transmission period (T_const) is again input. If the pulse train transmission period (T_const) is shorter, the process proceeds to step 210. A horizontal synchronization period may be used as the synchronization period.

At step 210, a data update period (T_pls=T_width/2) of the pulse signals with two phases is calculated. The process proceeds to step 211. At step 211, the calculated parameters described above (All_pulse, T_maxspeed, T_width, T_pls, T_const) are set and the process proceeds to a return routine at step 212. Then, the setting input processing program is ended.

After the setting processing program described above is performed, the analog position/digital pulse converting program shown in FIGS. 2A and 2B is performed, thereby making it possible to arbitrarily set the pulse width (T_width), the pulse train transmission period (T_const) and the like of the pulse signals with two phases as the interface signal output from the drive unit 160. This allows the pulse signals with two phases to be output to the virtual system 200 with the position resolution and response frequency which match the requirements of the virtual system 200. Consequently, it is possible to avoid the situation in which the virtual system 200 cannot respond to the pulse train signals with two phases from the drive unit 160.

If the pulse train transmission period (T_const) is not shorter than the video field period, the actual output timing of the pulse train signals with two phases lags the video field period. In Embodiment 3, however, whether the pulse train transmission period is shorter than the video field period or not is checked at step 209, so that the lag of the output timing can be avoided. The pulse train transmission period (T_const) can be set to 1/N (N is a natural number) of the video field period to detect the position of the zoom lens 105 or the like in synchronization with the video field period, which enables highly accurate virtual video combination.

Embodiment 4

Figure 7:
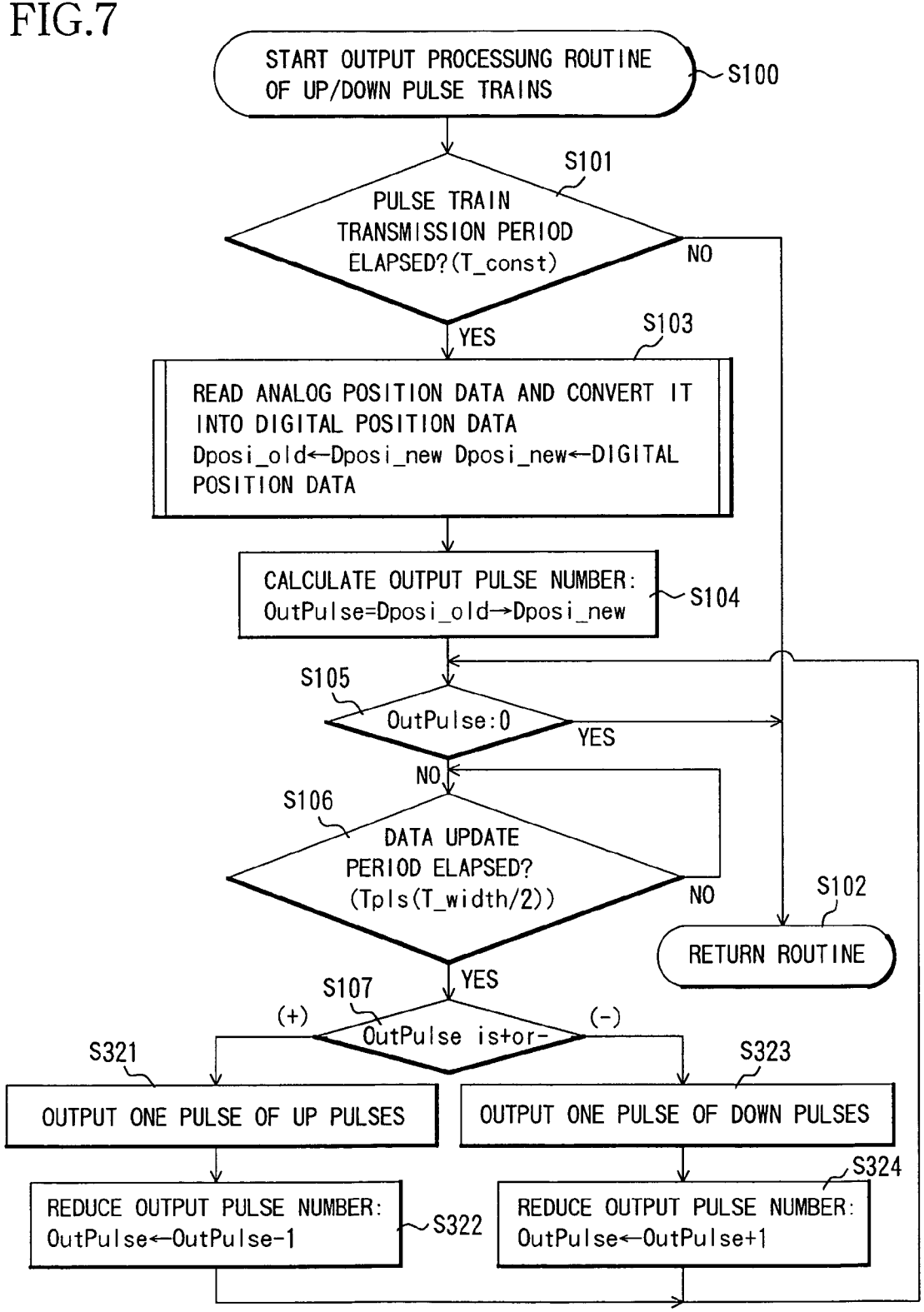
FIG. 7 is a flow chart of an UP/DOWN pulse train output processing program in Embodiment 4.

FIG. 7 shows an Up/Down pulse train output processing program serving as an analog position/digital pulse converting program which is performed in an analog position/digital pulse converting section of a drive unit constituting part of a virtual video combination system which is Embodiment 4 of the present invention. Description is herein made on the basis of a virtual video system which has the same structure as that shown in FIG. 1. Thus, components identical to those shown in FIG. 1 are designated with the same reference numerals as those in FIG. 1, and description thereof is omitted.

In Embodiment 4, the pulse train signals with two phases as the interface signal output from the drive unit 160 in Embodiment 1 are replaced with two digital signals of an UP pulse train signal (for example, a signal representing the movement of a zoom lens 105 toward the telephoto side) and a DOWN pulse train signal (for example, a signal representing the movement of the zoom lens 105 toward the wide-angle side).

In FIG. 7, step 100 to step 107 are the same as step 100 to step 107 shown in FIGS. 2A and 2B in Embodiment 1.

At step 321 to step 324, the output processing of the UP/DOAN pulse train signals is performed.

At step 107, if the sign of the number of output pulses (OutPulse) is positive, the process proceeds to step 321.

At step 321, the value of an output port of the UP pulse train provided for an analog position/digital pulse converting section 170 is changed to L, H, and then L to transmit a single pulse of the UP pulse component. Then, the process proceeds to step 322.

At step 322, the output pulse number (OutPulse) is reduced by one, and then the process returns to step 105.

On the other hand, if the sign of the output pulse number (OutPulse) is negative, the process proceeds to step 323.

At step 323, the value of an output port of the DOWN pulse train provided for the analog position/digital pulse converting section 170 is changed to L, H, and then L to transmit a single pulse of the DOWN pulse component. Then, the flow proceeds to step 324.

At step 324, the output pulse number (OutPulse) is reduced by one, and then the process returns to step 105.

Figure 8:
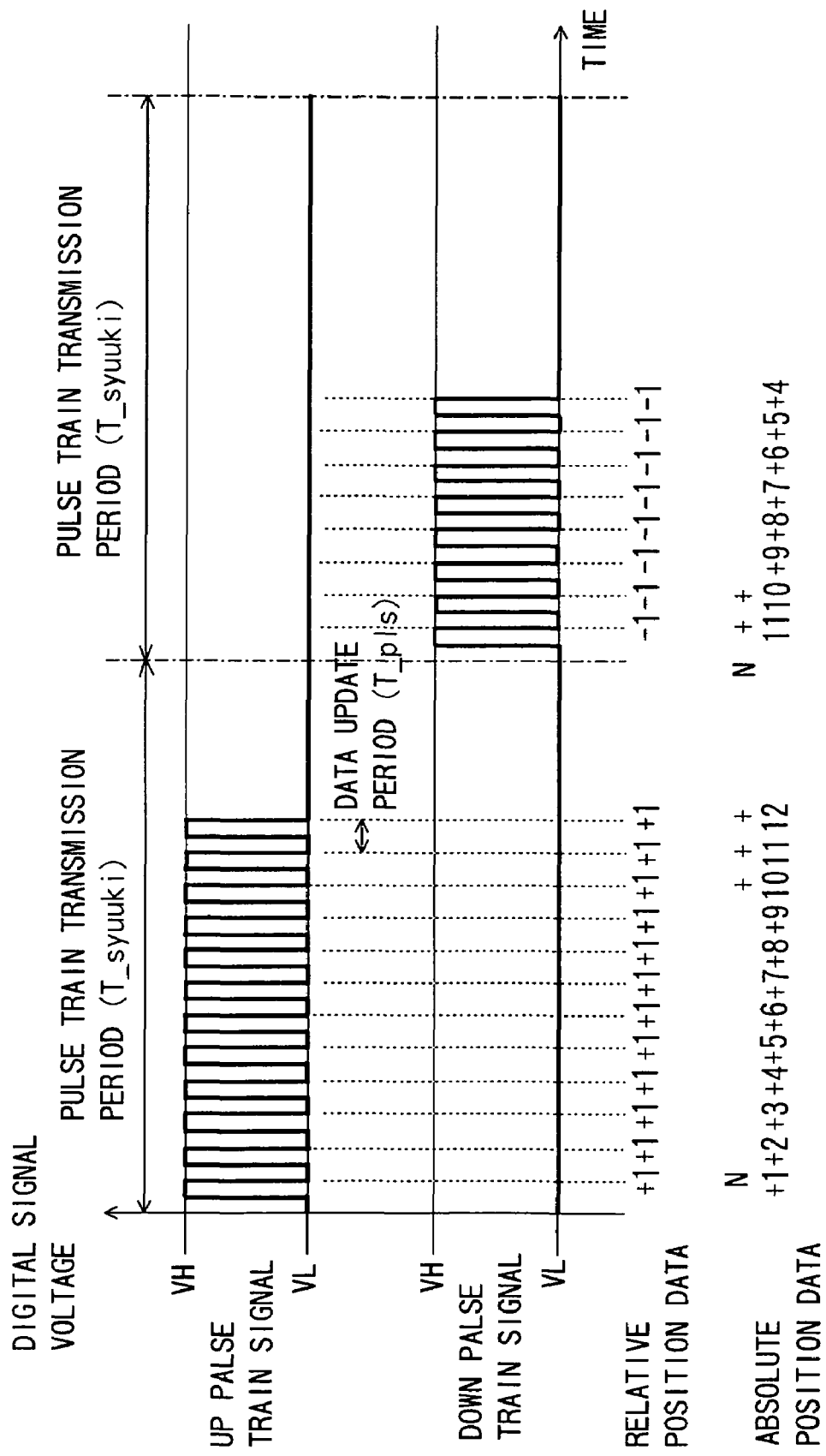
FIG. 8 shows, in detail, an interface signal between a television lens (drive unit) and a virtual system in Embodiment 4.
Figure 9:
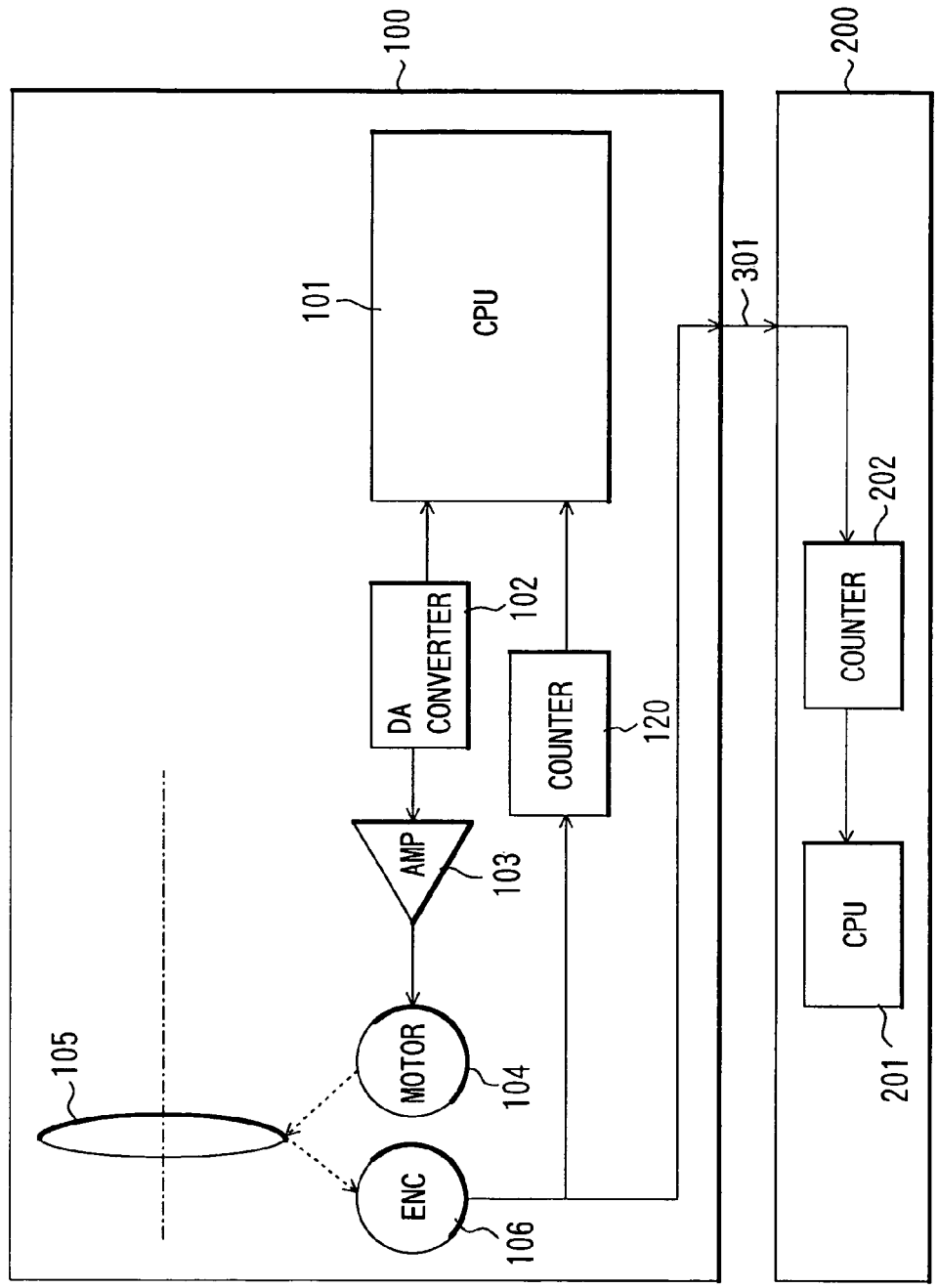
FIG. 9 is a block diagram showing a conventional virtual video combination system.
Figure 10:
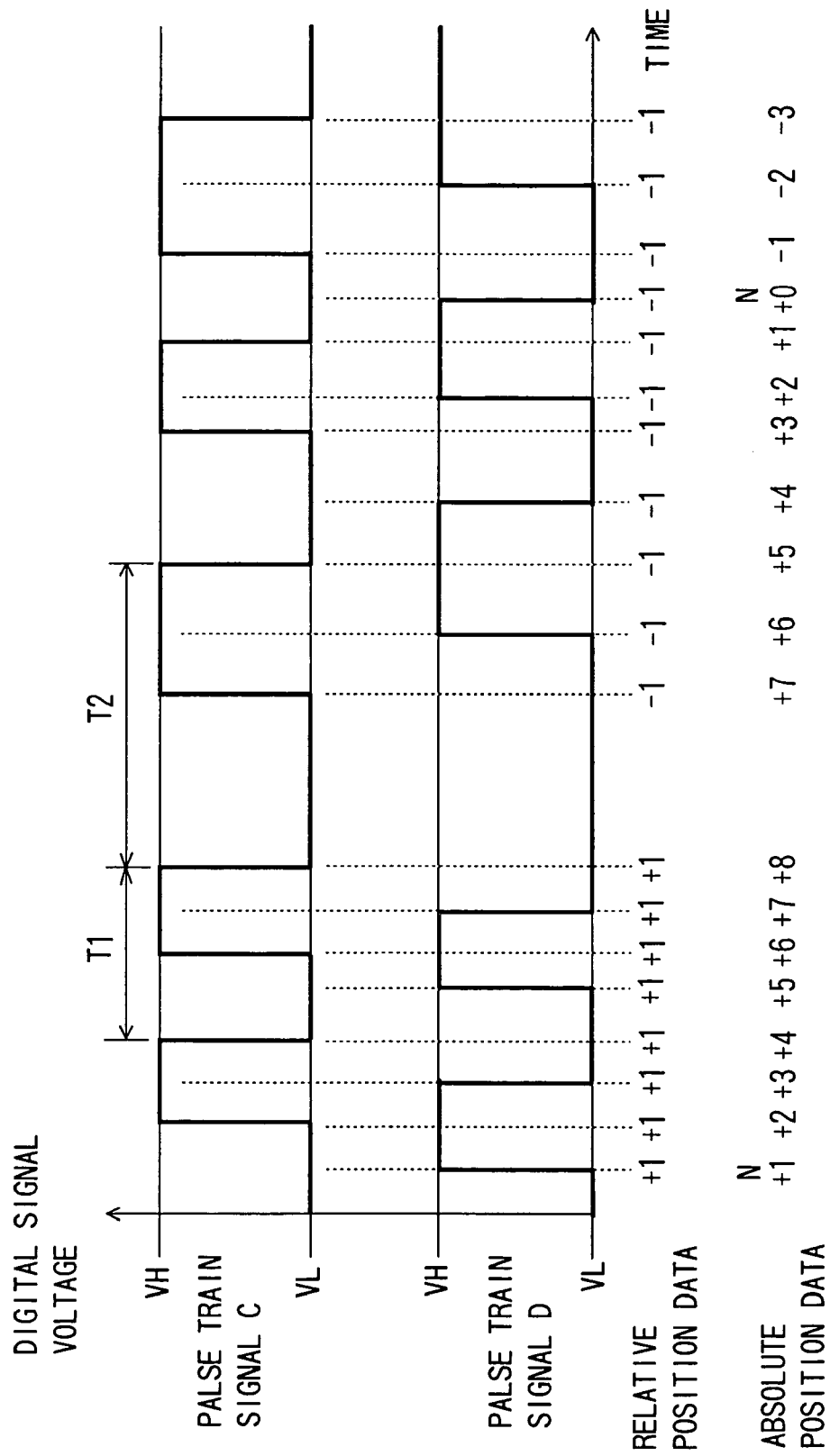
FIG. 10 shows, in detail, an interface signal between a television lens (drive unit) and a virtual system in the conventional example.
Figure 11:
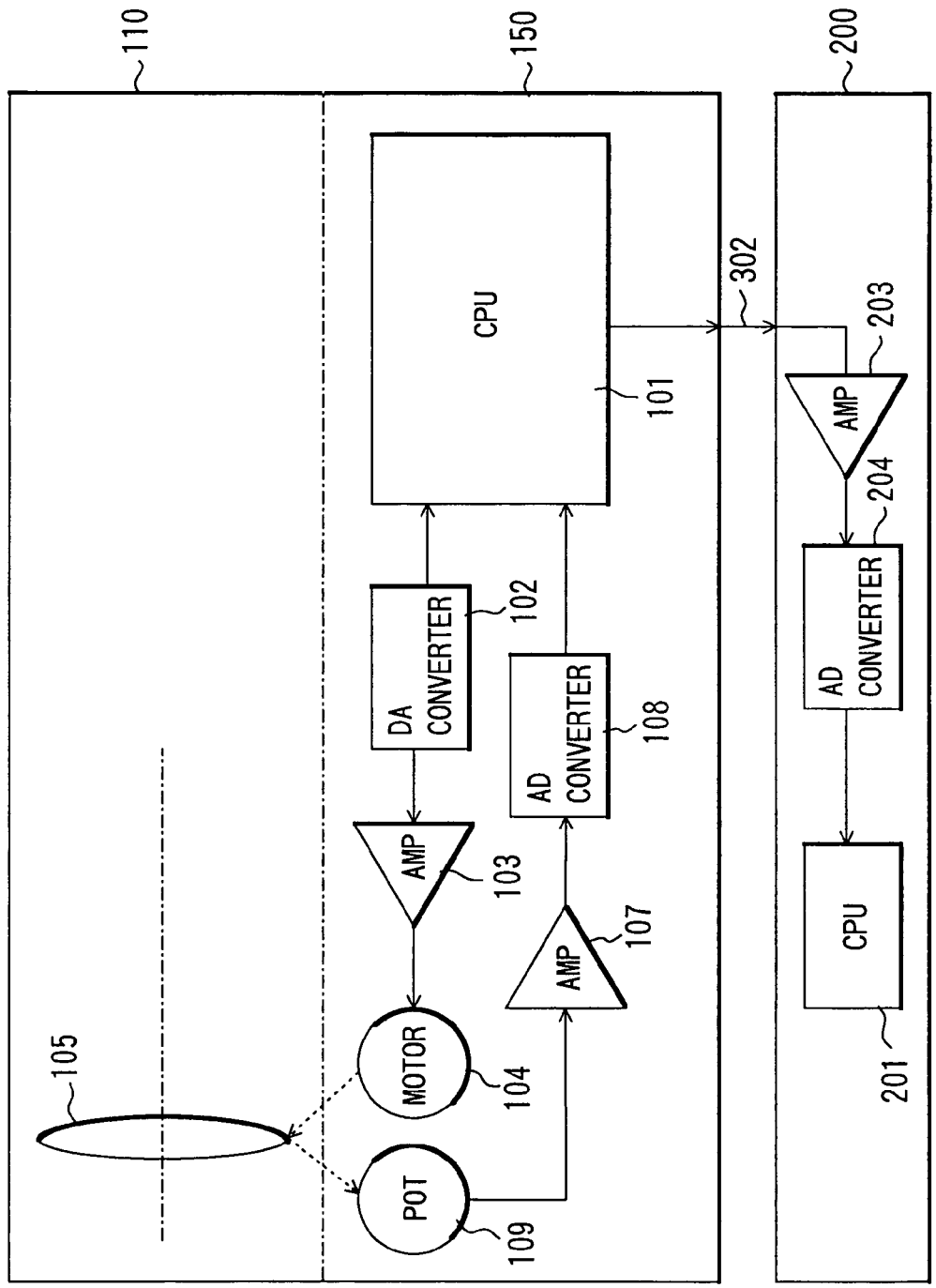
FIG. 11 is a block diagram showing a conventional virtual video combination system.
Figure 12:
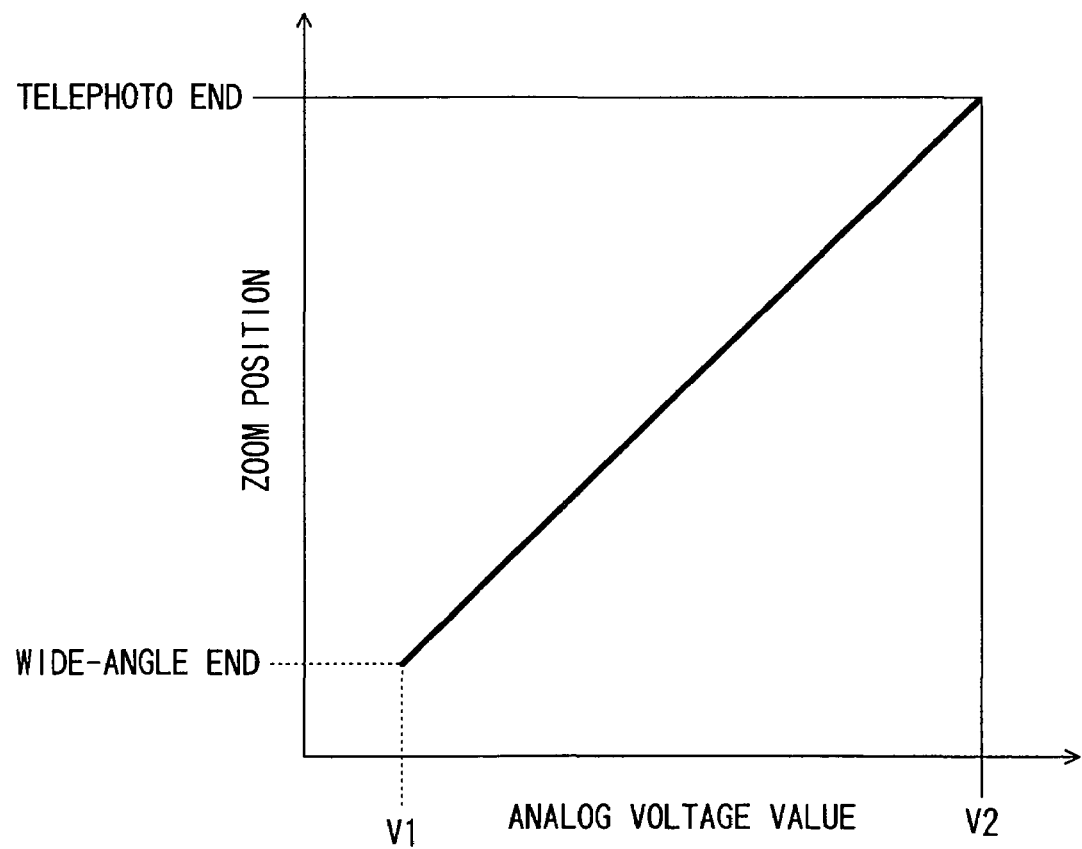
FIG. 12 shows, in detail, an interface signal between a television lens (drive unit) and a virtual system in the conventional example.

FIG. 8 shows an example of the aforementioned UP/DOWN pulse train signals based on the processing shown in FIG. 7. When the position of the zoom lens 105 is updated (moved), the analog position/digital pulse converting section 170 outputs the UP pulse train signal or the DOWN pulse train signal which has the pulse component number (output pulse number OutPulse) in accordance with the difference between the current and previous zoom positions for each pulse train transmission period (T_const) and has the pulse component existing for each data update period (T_pls) in accordance with the direction of the difference.

In FIG. 8, the UP pulse train signal output in the pulse train transmission period (T_const) on the left has 12 pulse components. In contrast, the DOWN pulse train signal has no pulse component. In this case, when a counter 202 of a virtual system 200 receives the UP pulse train signal, it produces relative position data +1 of the zoom position for each data update period (T_pls) and increments absolute position data of the zoom position by one. Then, the system CPU 201 takes the absolute position data to detect the zoom position (the position +12 shifted 11 pulse components to the positive side from the absolute position +1).

On the other hand, in FIG. 8, the DOWN pulse train signal output in the pulse train transmission period (T_const) on the right has 8 pulse components. In contrast, the UP pulse train signal has no pulse component. In this case, when the counter 202 of the virtual system 200 receives the DOWN pulse train signal, it produces relative position data −1 of the zoom position for each data update period (T_pls) and decrements absolute position data of the zoom position by one. Then, the system CPU 201 takes the absolute position data to detect the zoom position (the position +4 shifted 7 pulse components to the negative side from the absolute position +11).

While the pulse train signals with two phases are shown in conjunction with the zoom position, similar pulse train signals with two phases are generated for various optical adjustment units such as a focus lens, an iris, an extender and the like.

Similarly to Embodiment 1, in Embodiment 4, the interface signal output to the virtual system 200 from a camera system (110, 180) including the drive unit 160 can be realized by the UP/DOWN pulse train signals as the digital signals even when a potentiometer 166 outputs an analog position signal. It is thus possible to perform virtual video combination with high accuracy and less susceptibility to the influence of ambient noise.

In addition, the UP/DOWN pulse train signals with the uniform pulse width (T_width) can be output to prevent the situation in which the zoom lens 105 and other optical adjustment units are moved so fast that the virtual system 200 cannot respond thereto.

When the analog position signal is used as the interface signal, the operational amplifier and the AD converter are necessary in the reception circuit in the conventional virtual system 200. In contrast, Embodiment 4 can employ the digital reception circuit which requires none of them. This allows a wide variety of uses of the virtual system 200 and a reduction in cost of the virtual system 200.

While each of Embodiments 1 to 4 has been described for the handy-sized lens system which has the drive unit mounted on the television lens, the present invention is applicable to a so-called large television lens which has the function of a drive unit integrated into a television lens. The present invention is applicable not only to the aforementioned television lens for business use but also to a consumer video camera or a replaceable lens apparatus.

As described above, according to Embodiments 1 to 4, the two digital signals can be generated and output in accordance with the movement amount and the movement direction of the optical adjustment unit based on the analog position signal which represents the position of the optical adjustment unit such as the zoom lens, focus lens, iris, extender and the like. This allows the position detector system of the optical adjustment unit to be constituted with less susceptibility to external noise. As a result, it is possible to combine the video taken through the optical adjustment unit with other video, for example computer graphic images with high accuracy. In other words, the virtual video system can be provided with high accuracy of combination.

In addition, the apparatus (the video combining apparatus) which receives the aforementioned two digital signals can be constituted to have a wide variety of uses.

Since the digital signals are output in the uniform period with the uniform pulse width, it is possible to prevent the situation in which the apparatus on the reception side cannot respond thereto.

The output period and the pulse width of the digital signals can be variably set to improve the accuracy of image combination. The limitation imposed on the pulse width can lower the possibility that the virtual system cannot respond to the signals to reduce the accuracy of image combination. Also, the position resolution or the response speed which matches the performance requirements in the virtual system can be provided.

Moreover, since the output period of the digital signals is set to 1/N of the synchronization period of the video signal taken with the television camera, highly accurate image combination can be performed with little image displacement in the virtual system which combines images based on the synchronization period of the video signal.

While preferred embodiments have been described, it is to be understood that modification and variation of the present invention may be made without departing from the scope of the following claims.

"This application claims priority from Japanese Patent Application No. 2004-034988 filed on Feb. 12, 2004, which is hereby incorporated by reference herein."

What is claimed is:

1. A movement signal generation apparatus which generates a signal representing a movement of an optical adjustment unit, comprising:

an analog signal output section which outputs an analog signal in accordance with a position of the optical adjustment unit; and a digital signal generation section which generates two digital signals in accordance with a movement amount and a movement direction of the optical adjustment unit based on the analog signal, wherein each of the digital signals has pulse components of the number corresponding to the movement amount, wherein each of the digital signals is output as a pulse train in a uniform period regardless of a movement speed of the optical adjustment unit and the pulse components have a uniform pulse width, and wherein the digital signals are output in a period of the pulse train equal to 1/N of a synchronization period of a video signal taken with the optical adjustment unit, where N is a natural number.

2. A movement signal generation apparatus which generates a signal representing a movement of an optical adjustment unit, comprising:

an analog signal output section which outputs an analog signal in accordance with a position of the optical adjustment unit;

a digital signal generation section which generates two digital signals in accordance with a movement amount and a movement direction of the optical adjustment unit based on the analog signal, each of the digital signals having pulse components of the number corresponding to the movement amount; and a setting section which is used to variably set at least one of a period of a pulse train in which the digital signals are generated and a pulse width of the pulse components.

3. Memory storing thereon a computer-executable program, which when executed by a computer causes the computer to generate a signal representing a movement of an optical adjustment unit, the program including instructions to perform a plurality of steps comprising:

a first step of taking an analog signal in accordance with a position of the optical adjustment unit; and a second step of generating two digital signals in accordance with a movement amount and a movement direction of the optical adjustment unit based on the analog signal, wherein each of the digital signals has pulse components of the number corresponding to the movement amount, wherein each of the digital signals is output as a pulse train in a uniform period regardless of a movement speed of the optical adjustment unit and the pulse components have a uniform pulse width, and wherein the digital signals are output in a period of the pulse train equal to 1/N of a synchronization period of a video signal taken with the optical adjustment unit, where N is a natural number.

4. Memory storing thereon a computer-executable program, which when executed by a computer causes the computer to generate a signal representing a movement of an optical adjustment unit, the program including instructions to perform a plurality of steps comprising:

a first step of taking an analog signal in accordance with a position of the optical adjustment unit;

a second step of generating two digital signals in accordance with a movement amount and a movement direction of the optical adjustment unit based on the analog signal, each of the digital signals having pulse components of the number corresponding to the movement amount; and a third step of variably setting at least one of a period of a pulse train in which the digital signals are generated and a pulse width of the pulse components.

5. An optical device comprising:
the movement signal generation apparatus according to claim 1; and
the optical adjustment unit.

6. An optical device comprising:
the movement signal generation apparatus according to claim 2; and
the optical adjustment unit.

7. A video production system comprising:
the movement signal generation apparatus according to claim 1; and
a video combination apparatus which combines a first video signal taken with the optical adjustment unit with image information taken separately from the first video signal based on the two digital signals generated in the digital signal generation section of the movement signal generation apparatus.

8. A video production system comprising:
the movement signal generation apparatus according to claim 2; and
a video combination apparatus which combines a first video signal taken with the optical adjustment unit with image information taken separately from the first video signal based on the two digital signals generated in the digital signal generation section of the movement signal generation apparatus.

* * * * *